(12) United States Patent
Davis

(10) Patent No.: US 9,487,311 B2
(45) Date of Patent: Nov. 8, 2016

(54) APPARATUS AND METHODS TO PROVIDE A SURFACE HAVING A TUNABLE EMISSIVITY

(75) Inventor: Keith J. Davis, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 915 days.

(21) Appl. No.: 13/342,723

(22) Filed: Jan. 3, 2012

(65) Prior Publication Data

US 2013/0170020 A1 Jul. 4, 2013

(51) Int. Cl.
| | |
|---|---|
| *B64G 1/50* | (2006.01) |
| *G02B 5/20* | (2006.01) |
| *G02B 1/00* | (2006.01) |
| *H01Q 15/00* | (2006.01) |
| *H01Q 1/28* | (2006.01) |

(52) U.S. Cl.
CPC ............... *B64G 1/50* (2013.01); *G02B 1/002* (2013.01); *G02B 5/204* (2013.01); *H01Q 15/002* (2013.01); *G02F 2202/30* (2013.01); *H01Q 1/288* (2013.01)

(58) Field of Classification Search
None
See application file for complete search history.

(56) References Cited

U.S. PATENT DOCUMENTS

| | | | |
|---|---|---|---|
| 4,656,487 A | | 4/1987 | Sureau et al. |
| 5,455,594 A | | 10/1995 | Blasing et al. |
| 5,619,366 A | | 4/1997 | Rhoads et al. |
| 5,627,541 A | * | 5/1997 | Haley et al. ............ 342/1 |
| 6,084,702 A | * | 7/2000 | Byker et al. ...... B32B 17/10036 106/31.17 |
| 6,538,596 B1 | | 3/2003 | Gilbert |
| 7,390,123 B2 | | 6/2008 | Friedman |
| 7,691,284 B2 | | 4/2010 | Cumberland et al. |
| 8,017,217 B1 | | 9/2011 | Gregoire et al. |
| 8,106,850 B1 | * | 1/2012 | Gregoire et al. .... H01Q 15/002 343/909 |
| 2007/0132645 A1 | | 6/2007 | Ginn et al. |
| 2009/0273527 A1 | | 11/2009 | Bahdad |
| 2011/0148738 A1 | * | 6/2011 | Sim ............................ 343/909 |

OTHER PUBLICATIONS

Greffet et al., "Mictrostructured Radiators", esa, Jan. 7, 2007, (50 pages).
Hulya Demiryont and David Moorehead, "Electrochromic Emissivity Modulator for Spacecraft Thermal Management", Eclipse Energy Systems, Inc. Feb. 20, 2009, (4 pages).
"Electrochromism." Wikipedia. Last revised Aug. 10, 2011. Retrieved from <http://en.wikipedia.org/wiki/Electrochromism> on Jan. 3, 2012, (2 pages).
International Bureau, "International Preliminary Report on Patentability," issued in connection with Application No. PCT/US2012/062620, Jul. 8, 2014, 7 pages.
Patent Cooperation Treaty, "International Search Report and Written Opinion", issued in connection with PCT application No. PCT/US2012/062620, mailed Feb. 22, 2013 (11 pages).
State Intellectual Property Office of PRC, "Office Action," issued in connection with Application No. 201280065715.4, issued on Jul. 3, 2015, and English translation. 12 pages.

* cited by examiner

*Primary Examiner* — Stephone B Allen
*Assistant Examiner* — James McGee
(74) *Attorney, Agent, or Firm* — Hanley, Flight & Zimmerman, LLC

(57) ABSTRACT

Apparatus and methods to provide a surface having a tunable emissivity are disclosed. An example apparatus includes an impedance layer comprising a layer of dielectric material to be attached to an electrically reflective ground plane, and a plurality of resonators arranged within the impedance layer, wherein an emissivity of the apparatus is based on a characteristic of the resonators.

20 Claims, 11 Drawing Sheets

US 9,487,311 B2

APPARATUS AND METHODS TO PROVIDE A SURFACE HAVING A TUNABLE EMISSIVITY

FIELD

This disclosure relates generally to the emissivity of materials, and, more particularly, to apparatus and methods to provide a surface having a tunable emissivity.

BACKGROUND

Spacecraft are exposed to a wide range of radiation environments during service. The external surfaces of the spacecraft may be heated by absorption of radiation (e.g., solar radiation) and/or cooled by infrared radiation. The heating and cooling may occur alternately as the spacecraft in and out of a line-of-sight of the sun. The heating and cooling may also occur simultaneously when a side facing the sun is heated while a side facing the void of space is cooled. The temperature of the spacecraft is based on the balance of heating and cooling in the spacecraft.

Prior art materials have static emissivity properties that are inherent to the materials and cannot be changed. As a result, obtaining a material that has a desired emissivity in a particular radiation frequency range involves finding a suitable material having the desired emissivity property.

Accordingly, there is a need for an apparatus having a tunable emissivity. The apparatus may be incorporated into a surface. Tuning may involve increasing, decreasing, and/or optimizing an amount of radiated energy reflected, absorbed, and/or emitted.

SUMMARY

Apparatus and methods to provide a surface having a tunable emissivity are disclosed. A disclosed example apparatus includes an impedance layer and a plurality of resonators. The example impedance layer includes a layer of dielectric material to be attached to an electrically reflective ground plane. The example resonators are arranged within the impedance layer, and an emissivity of the apparatus is based on a characteristic of the resonators.

Another example material is also disclosed. The example material includes a dielectric layer and a plurality of resonators, where the plurality of resonators are positioned a distance from a ground plane such that energy reflected from the resonators experience destructive interference with energy reflected from the ground plane. The example material also includes a resistive material electrically coupled to at least one of the resonators. The resistive material exhibits electron migration in response to an electric field. The example material includes a conductive layer to generate the electric field, where the electric field is to change a reflectance of the at least one of the resonators.

A disclosed example method includes tuning a characteristic of one or more resonators in a material. Tuning the characteristic changes absorption of radiation by the one or more resonators. Tuning the characteristic also changes an amount of destructive interference caused by the material.

The features, functions, and advantages that have been discussed can be achieved independently in various embodiments or may be combined in yet other embodiments, further details of which can be seen with reference to the following description and drawings.

Figure 1:
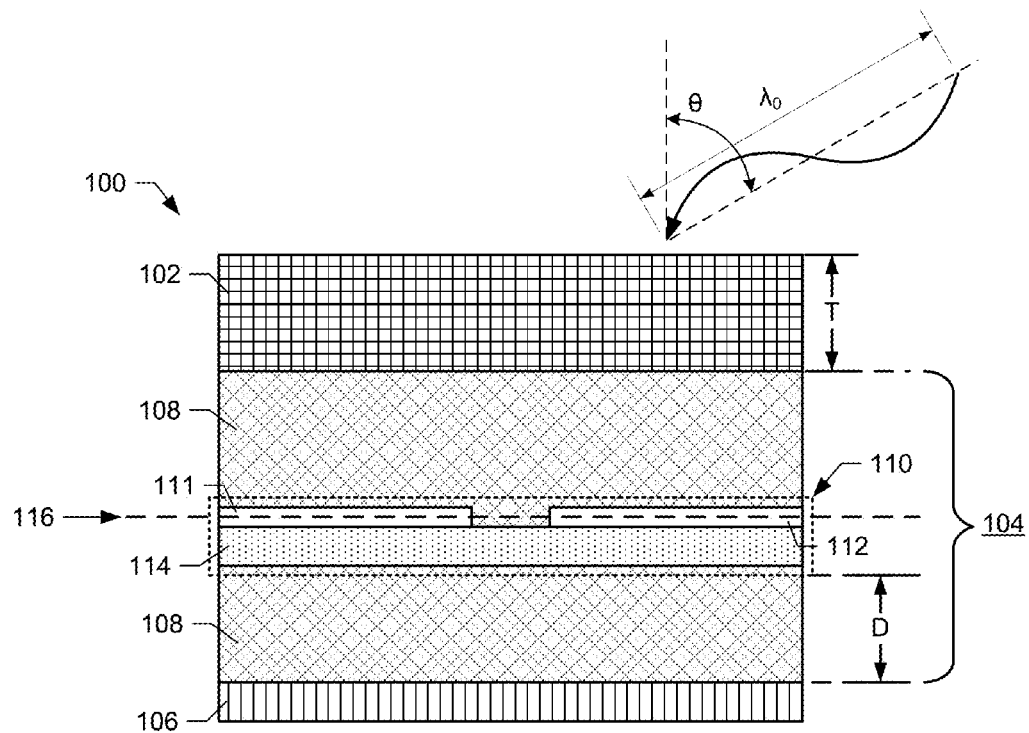
FIG. 1 is a sectional view of an example apparatus having a tunable emissivity constructed in accordance with the teachings of this disclosure.

To clarify multiple layers and regions, the thicknesses of the layers are enlarged in the drawings. Accordingly, the structures illustrated in the drawings are not drawn to scale and, instead, are drawn to clarify the teachings of this disclosure. Wherever possible, the same reference numbers will be used throughout the drawing(s) and accompanying written description to refer to the same or like parts. As used in this patent, stating that any part (e.g., a layer, film, or area) is in any way positioned on (e.g., positioned on, located on, disposed on, attached to, or formed on, etc.) another part, means that the referenced part is either in contact with the other part, or that the referenced part is adjacent the other part with one or more intermediate part(s) located therebetween. Stating that any part is in contact with another part means that there is no intermediate part between the two parts.

DETAILED DESCRIPTION

Examples disclosed herein may be used to provide a sheet-shaped apparatus (e.g., a metamaterial) having a tunable emissivity. The examples disclosed herein may be used to provide a layer, a coating or covering on a surface such as on a spacecraft, a building, and/or any other structure that may benefit from increasing, decreasing and/or optimizing an amount of radiated energy reflected, absorbed, and/or emitted. In some examples, the emissivity is tuned prior to application to a surface. In some examples, the emissivity is tunable after application to the surface. Some examples disclosed herein provide control over the emissivity of a sheet-shaped apparatus applied to a surface. In some such examples, an electrical signal may be applied to tune the emissivity.

Figure 8:
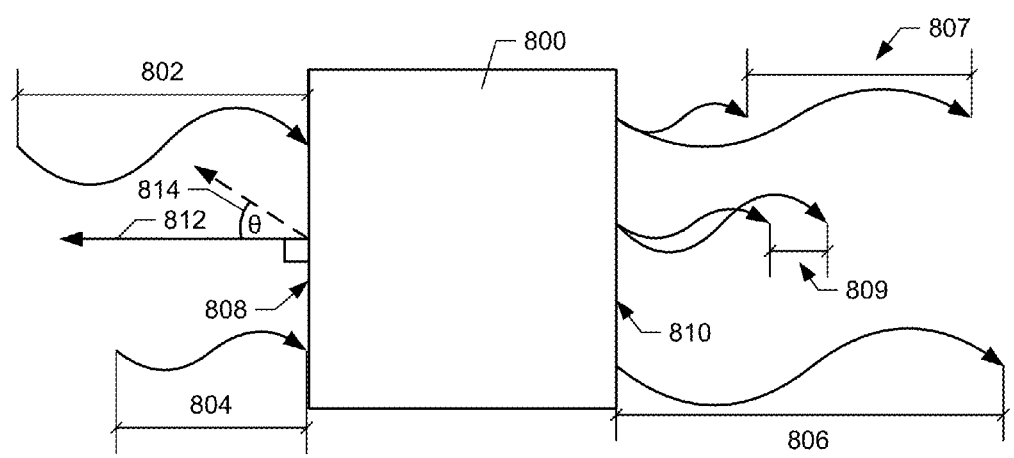
FIG. 8 illustrates an example body in which heat absorption occurs at shorter wavelengths and heat emission occurs at longer wavelengths.

An application of the examples disclosed herein includes providing thermal control of a structure (e.g., a building, a spacecraft, etc.). An illustration an example body 800 is shown in FIG. 8, in which heat absorption occurs at shorter wavelengths 802, 804 and heat emission occurs at longer wavelengths 806 (e.g., the 7-25 μm wavelength range 807). For example, the body 800 of FIG. 8 may be a flat panel in earth orbit having a front-side solar absorption coefficient (α) of 0.0885.

When the body 800 remains at thermal equilibrium, the energy in absorbed waves of wavelengths 802, 804 is equal to the energy in waves at the longer wavelengths 806. The front side 808 of the example body 800 (e.g., panel) has a fixed emissivity of 1 in the 8-12 micron band 809 and zero in other wavelengths, and the back side 810 of the body 800 is 100% reflective (∈=0, solar α=0) in the 8-12 micron band 809. The temperature of the example body 800 (e.g., the body 800, the front side 808 surface of the body 800, and/or the back side 810 surface of the body 800) may be controlled by controlling the emissivity of the body or surface in one or more of the visible band and/or the IR band(s). The temperature of the example body 800 of FIG. 8 may be increased by, among other things, restricting emissions of waves in the longer wavelengths 806. Conversely, the temperature of the example body 800 may be decreased by, among other things, permitting more emissions of waves in the longer wavelengths 806.

In the example of FIG. 8, the equilibrium temperature of the body 800 is about 300 degrees Kelvin (K) when the normal direction 812 of the front side 808 surface points directly at the sun, assuming a solar irradiance of 1366 watts per square meter (W/m$^2$). When the surface normal direction 812 points away from the sun at an incident angle 814, θ, the absorbed power is reduced by a factor cos(θ) while the self-emission of the body 800 remains constant. As a result, the equilibrium temperature of the body 800 decreases as the incident angle 814 θ increases, leading to a temperature drop ΔT=−100 K when the incident angle 814 θ is about 85°.

Using the examples disclosed herein, the emissivity of a surface may be controlled so that it is matched (e.g., numerically equal) to cos(θ). Thus, the same body 800 noted above, but including the above-noted example apparatus can maintain a constant 300 K, independent of orientation, because the absorption and emission are controlled to be equal. Accordingly, the tunable emissivity of the examples disclosed herein may be used to limit temperature swings.

In another example application, buildings in highly solar-irradiated areas have relatively high heating loads and/or cooling requirements. The examples disclosed herein may be used to increase emissivity of the example apparatus during daylight hours to reduce the cooling requirements by emitting heat via LWIR energy. Additionally or alternatively, the examples may be controlled to decrease emissivity to retain heat as desired to, for example, decrease a heating load during non-daylight hours.

FIG. 1 is an elevated sectional view of an example apparatus 100 having a tunable emissivity constructed in accordance with the teachings of this disclosure. While many known materials and apparatus have fixed emissivities, the emissivity of the example apparatus 100 may be varied or controlled to have a desired emissivity. The example apparatus 100 of FIG. 1 includes an anti-reflective coating 102, an impedance layer 104, and an electrically reflective ground plane 106.

The example apparatus 100 may also be referred to as a structure, device, and/or metamaterial. Regardless of the term used to refer to the example apparatus 100, the example apparatus 100 is constructed using multiple layers of material and may be shaped as a contiguous sheet or layer, which may be attached, applied, or otherwise coupled to other structures, devices, or apparatus. In this manner, the example apparatus 100 may be used to provide a tunable emissivity outer surface to such a structure, device, or apparatus, thereby enabling improved temperature control and/or other operational characteristics of the structure, device, or apparatus to which the example apparatus 100 is coupled.

Turning in detail to FIG. 1, the example anti-reflective coating 102 is positioned as an outer layer of the apparatus 100 (e.g., the first layer that radiation enters from an environment external to the apparatus 100). The example anti-reflective coating 102 of FIG. 1 has a thickness T of about ¼ of a wavelength of interest ($\lambda_O$). However, different types of anti-reflective coatings having different thicknesses may alternatively be used.

The wavelength of interest $\lambda_O$ may be any wavelength within a range of wavelengths of interest. For example, the wavelength of interest $\lambda_O$ may be 10 micrometers (microns, μm), which is in the range of long wave infrared radiation (LWIR) (e.g., 8-15 μm). In many example systems, emission of heat from a body or surface occurs in the LWIR wavelengths, while absorption of heat occurs at visible or near infrared (near IR) wavelengths. As discussed above in the example of FIG. 8, heat absorption in the body 800 occurs at shorter wavelengths 802, 804 and heat emission occurs at longer wavelengths 806.

Accordingly, in some examples the temperature of a body or surface may be controlled by controlling the emissivity of the body or surface in one or more of the visible band and/or the IR band(s). The temperature of the example body 800 of FIG. 8 may be increased by, among other things, restricting emissions of waves in the longer wavelengths 806. Conversely, the temperature of the example body 800 may be decreased by, among other things, permitting more emissions of waves in the longer wavelengths 806. In some ranges of wavelengths, the center wavelength is the wavelength $\lambda_O$ of interest and the thickness may be ¼ of any of the wavelengths within the range of wavelengths of interest. The anti-reflective coating 102 reduces reflections and increases control over emissivity of the apparatus 100.

The example impedance layer 104 includes dielectric material or layers 108 and a resonator 110 arranged within the dielectric material 108. As used herein, a resonator refers to any electrically resonant structure having spectral characteristics principally defined by geometry is based on a load. For example, the resonator 110 of FIG. 1 is implemented using an electrically resonant structure including at least a conductive element 111, 112 and a resistive element 114, such as an antenna and a corresponding antenna load.

In some examples, the dielectric material 108 is substantially contiguous within the impedance layer 104. In some other examples, the dielectric material 108 is divided by the resonator 110 (e.g., the conductive elements 111, 112) and/or the resistive element 114 into multiple layers. The example resistive element 114 may include one or more resistors, resistance sheets, and/or other electrically-resistive structures. The example resonator 110 is positioned a distance D of about ¼ (e.g., within a factor of 2, or ⅛ to ½) of the wavelength of interest from the electrically reflective ground plane 106. The wavelength of interest may be different within the impedance layer 104 and/or within the dielectric material 108 relative to the external environment based on the respective refractive indices of the impedance layer 104, the dielectric material 108, and the external environment.

The example resonator 110 may alternatively be positioned in ½-wavelength increments from about ¼ wavelength (e.g., ¾ wavelength, 1¼ wavelength, etc.) from the example ground plane 106. Using one of these example positionings or spacings, energy reflected by the ground plane 106 in the wavelength or wavelength range of interest has approximately an additional ½-wavelength to travel than energy reflected by the ground plane 106 in the same wavelength or wavelength range, causing destructive interference. Characteristics of the example resonator 110 may be tuned to change the amount of destructive interference. Example characteristics that may be tuned include the geometry of the resonator 110 (e.g., the sizes, shapes, and/or configurations of the conductive elements 111, 112), the resistivity of the resistive layer 114, and/or the configuration relative to (e.g., relative orientations and/or distance between) other resonators 110 in a material.

The example resonator 110 of FIG. 1 (e.g., the conductive elements 111, 112) is arranged in a plane (e.g., a resonator plane 116, which has a thickness equal to the thickness of the resonator 110) within the dielectric material 108. The resonator plane 116 in which the resonator 110 is arranged is substantially parallel to the ground plane 106. While the resonator plane 116 and the ground plane 106 are described as planes, the term "plane" may refer to curved or other non-flat surfaces in addition to flat surfaces. For example, if the ground plane 106 is curved (e.g., as on a cylindrical, spherical or partially spherical surface, etc.), the resonator 110 is also arranged on a spherical plane so as to be substantially normal to the normal of the ground plane 106 at any given location. For clarity and brevity, the examples described herein and illustrated in the corresponding figures use flat ground planes and flat resonator planes.

The example electrically reflective ground plane 106 of FIG. 1 is completely or substantially completely electrically reflective in the wavelength range of interest. In some examples, the electrically reflective ground plane 106 is also used as the outer surface to which the example apparatus 100 is fixed and, in that case, is not part of the apparatus 100. In some other examples, the apparatus 100 is constructed to include the electrically reflective ground plane 106.

Figure 2:
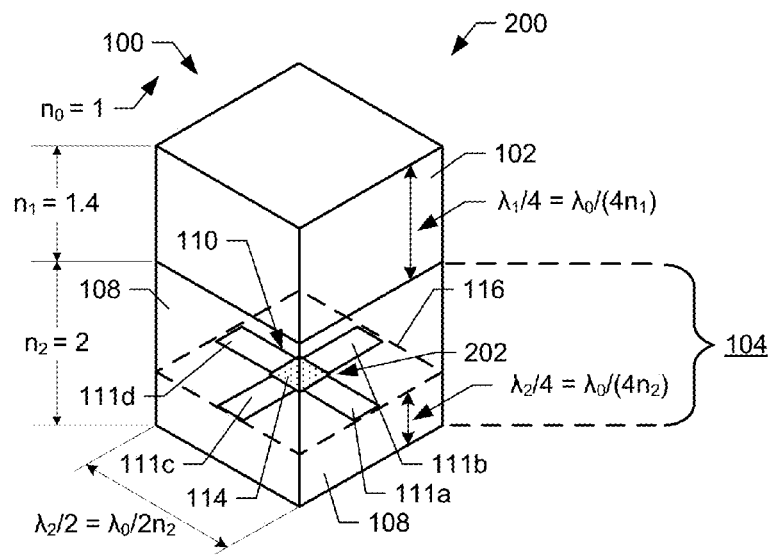
FIG. 2 is a perspective view of the example apparatus of FIG. 1.

FIG. 2 is a perspective view of the example apparatus 100 of FIG. 1. The view of FIG. 2 illustrates a single cell or unit 200 of the apparatus 100. The illustrated unit 200 of the apparatus 100 may be repeated to form a layer or sheet to cover substantially any size surface. As shown in FIG. 2, the example apparatus 100 includes the anti-reflective coating 102 and the impedance layer 104. The electrically reflective ground plane 106 is not visible in the view of FIG. 2.

As illustrated in FIG. 2, the anti-reflective coating 102 has a refractive index $n_1$ approximately equal to the square root of the refractive index $n_2$ of the impedance layer 104. In some examples, the refractive index $n_2$ of the impedance layer 104 is substantially determined by the refractive index of the dielectric material 108. In the example of FIG. 2, the environment external to the apparatus 100 (e.g., air, space, etc.) has a refractive index $n_0$. The thickness of the example anti-reflective coating 102 of FIG. 2 is ¼ of the wavelength of interest. The refractive index $n_1$ of the anti-reflective coating 102 is different than the refractive index $n_0$ of the external environment. As a result, the thickness of the example anti-reflective coating 102 is based on the wavelength of the frequency of interest in the anti-reflective coating (e.g., as changed by the interface between the anti-reflective coating 102 and the external environment).

The width of the example unit 200 of FIG. 2 and the width of the example resonator 110 is based on the wavelength of interest $\lambda_0$, as modified by the different refractive index $n_2$. Thus, the width in FIG. 2 is equal to $\lambda_2/2$, or $\lambda/2n_2$. For LWIR radiation with a center frequency, or frequency of interest, of 8 μm and an impedance layer 104 having a refractive index of $n_2=2.0$, the widths of the example unit 200 and the example resonator 110 are both about 2 μm.

The example resonator plane 116 of FIG. 2 is substantially parallel to the electrically reflective ground plane 106 and is located approximately ¼ of the wavelength of interest from the electrically reflective ground plane 106. The refractive index $n_2$ of the anti-reflective coating 102 is different than the refractive index $n_0$ of the external environment. As a result, the ¼-wavelength distance is based on the wavelength of the frequency of interest in the impedance layer 104 (e.g., as changed by the interface(s) between the impedance layer 104 and the external environment).

The resistive material 114 of FIG. 2 electrically couples arms 111a-111d of the resonator 110. The arms 111a-111d are also electrically coupled to form a crossed dipole 202. The resistive material 114 acts as a matching network for the resonator 110 (e.g., determines a resonance characteristic of the resonator 110). In other words, the impedance (e.g., resistance and/or reactance) of the resistive material 114 affects the absorption of radiation by the resonator 110. The impedance of the example resistive material 114 may be controlled by selecting a value for the resistivity of the resistive material 114 (e.g., by selecting a particular material having a desired resistivity) and/or by selecting a geometry of the resistive material 114. While an example crossed dipole geometry is illustrated in FIG. 2, other geometries may be used.

By changing the impedance (e.g., resistance/resistivity and/or reactance) of the resistive material 114, the emissivity of the resonator 110 and, thus, the emissivity of the example apparatus 100 are changed. For example, as the difference between the impedance of the resistive material 114 and the impedance of the resonator 110 increases, the operation of the example resonator 110 is more like that of a Salisbury screen (e.g., the resonator 110 becomes reflective and destructive interference occurs between radiation reflecting from the resonator 110 and energy reflecting from the ground plane 106) and emissivity decreases. In contrast, as the difference between the impedance of the resistive material and the impedance of the resonator 110 decreases, the resonator 110 absorbs more radiation and operates less like a Salisbury screen (e.g., the resonator 110 becomes absorptive) and emissivity increases.

Figure 3:
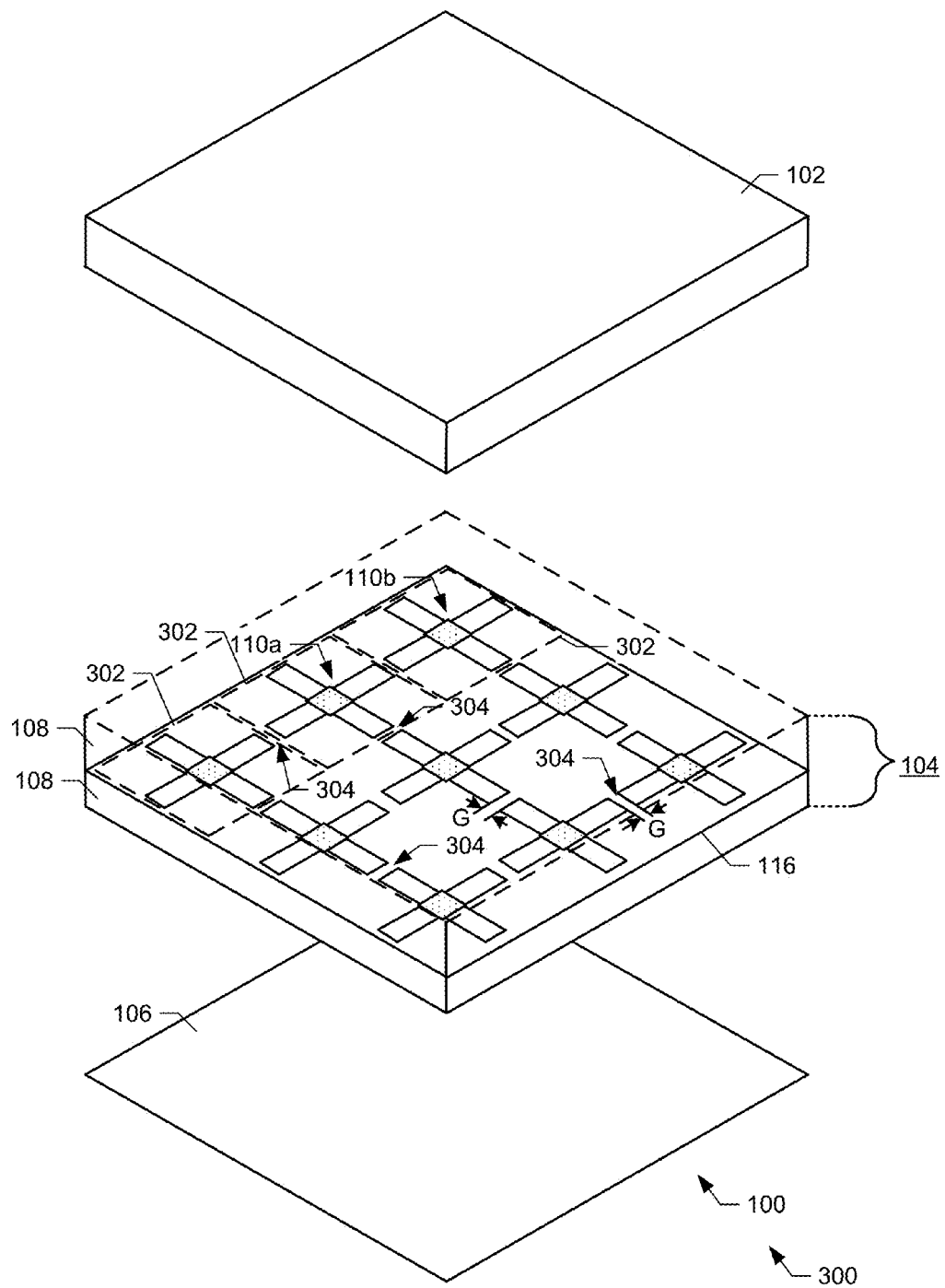
FIG. 3 is an exploded perspective view of an example sheet-shaped implementation of the example apparatus of FIGS. 1 and 2.

FIG. 3 is an exploded perspective view of an example sheet-shaped implementation 300 of the example apparatus 100 of FIGS. 1 and 2. As illustrated in FIG. 3, the sheet 300 includes 9 unit cells 302 (e.g., 3 cells by 3 cells) of the apparatus 100. The example resonators 110 are arranged to form a screen and are separated from adjacent resonators by spaces 304. The example spaces 304 have a gap length G. However, the gap length G may be different distances and/or may be measured differently based on the geometries of the resonators 110. Similar to the example resistive material 114 of FIG. 1, the example spaces 304 separating the resonators 110 have corresponding impedances. The spaces 304 of the illustrated example electrically couple respective ones of the resonators 110, with impedances between the respective resonators. The impedances of the example spaces 304 of FIG. 3 are based on the impedance of the dielectric material 108 and the length of the space between adjacent resonators 110. The impedances may be similar to or different from the impedances of the resistive material 114. As shown in FIG. 3, at least some of the dielectric material 108 is located on one side of (e.g., above) the resonators 110 and at least some of the dielectric material 108 is located on the opposite side of (e.g., below) the resonators 110. In other words, the dielectric material 108 of FIG. 3 sandwiches the resonators 110. As used herein, the resonators 110 are within the dielectric material 108 if portions of the dielectric material 108 are located on opposite sides of the resonators 110, even if the dielectric material 108 is physically split into two layers located on different sides of the resonator 110.

The example apparatus 100 of FIGS. 1-3 may be constructed using methods such as sputtering, vapor deposition, photo-lithography and/or electron-beam lithography (e.g., for the dielectric material 108, for the resonators 110, the arms 111, 112, and/or the resistive material 114). However, any suitable past, present, or future method may be used to manufacture the example apparatus 100 of FIGS. 1-3.

The emissivity of the example apparatus 100 of FIGS. 1-3 is tuned at the time of fabrication of the example apparatus 100. For example, one or more geometries of the resonators 110, the selection(s) and/or one or more geometries of the resistive material 114 (or the application of a pre-selected resistive material 114), the positioning of the resonators 110 relative to the conductive ground plane 106, and/or the selection or omission of an anti-reflective coating 102 may be used to tune the emissivity of the apparatus 100 at the time of fabrication of the apparatus 100.

In some examples, a characteristic of one or more of the resonators 110 in the example apparatus 100 may be tuned to change an absorption of radiation by the resonators 110 and to change an amount of destructive interference caused by the apparatus 100. For example, one or more of the one or more geometries of the resonators 110, the selection(s) and/or one or more geometries of the resistive material 114 (or the application of a pre-selected resistive material 114), the positioning of the resonators 110 relative to the conductive ground plane 106, and/or the selection or omission of an anti-reflective coating 102 may be used to change the absorption of radiation and/or to change an amount of destructive interference caused by the apparatus 100.

Figure 4A:
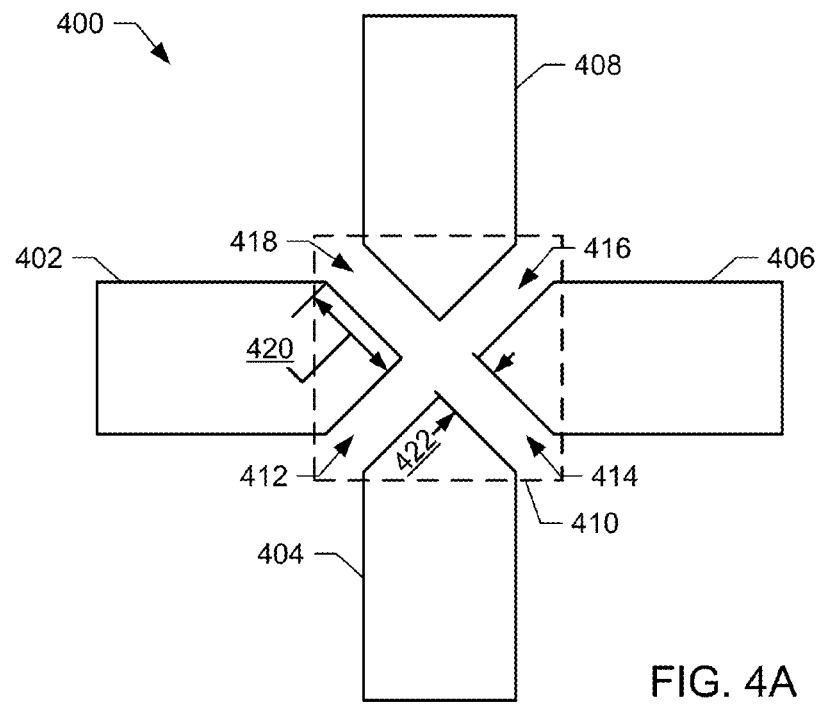
FIGS. 4A, 4B, and 4C illustrate example dipole antennas that may be used to implement the examples of FIGS. 1-3.

FIG. 4A illustrates an example crossed dipole antenna 400 that may be used to implement the example apparatus 100 of FIGS. 1-3. The example antenna 400 of FIG. 4A may be used as the resonator 110 for each of the example units 200 of FIG. 2 and/or may be arranged in a grid (e.g., sheet) configuration as illustrated in FIG. 3. The antenna 400 may additionally or alternatively be arranged or configured in arrangements or patterns other than a grid. As with all of the examples disclosed herein, the example dipole antenna 400 of FIG. 4A is not necessarily drawn to scale.

As illustrated in FIG. 4A, the example antenna 400 is a crossed dipole antenna that includes four arms or conductive elements 402, 404, 406, 408 (e.g., similar to the arms 111a-111d of FIG. 2). The arms 402-408 have substantially the same dimensions but different orientations. The example arms 402-408 are separated in a center region 410 by gaps 412, 414, 416, 418. The example gaps 412-418 include (e.g., are immediately adjacent to) a resistive material (e.g., the resistive material 114 of FIGS. 1-2), which electrically couples the arms 402-408. The resulting impedance between respective ones of the arms 402-408 of FIG. 4A depends on a length 420 and a width 422 of the gaps 412-418 and the resistivity of the resistive material. An example analysis of the antenna 400 of FIG. 4 is described below in conjunction with FIGS. 5A and 5B.

Figure 4B:
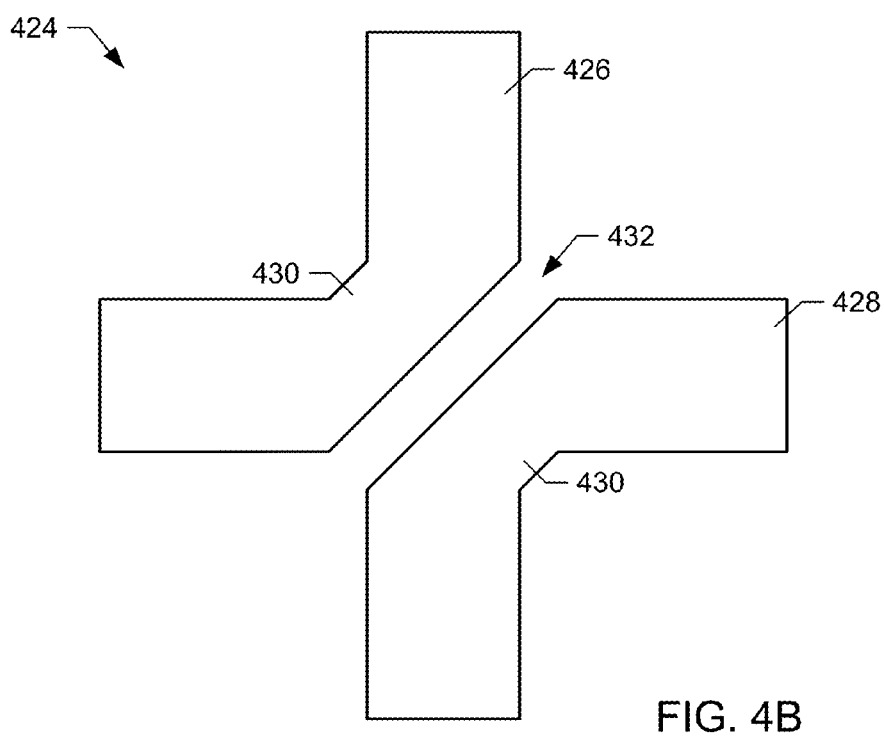

FIG. 4B illustrates another example dipole antenna 420 that may be used to implement the example apparatus 100 of FIGS. 1-3. The example antenna 424 of FIG. 4B may be used as the resonator 110 for each of the example units 200 of FIG. 2 and/or may be arranged in a sheet configuration as illustrated in FIG. 3.

As illustrated in FIG. 4B, the example antenna 424 is a dipole antenna that includes the arms or conductive elements 426, 428. Unlike the example arms 402-408 of FIG. 4A, the arms 426, 428 have portions oriented in multiple directions (e.g., at substantially 90 degree angles) and are electrically coupled via a conductor 430 instead of a resistive material 114. The arms 426, 428 of FIG. 4B have substantially the same dimensions but different orientations. Like the example arms 402-408 of FIG. 4A, the example arms 426, 428 of FIG. 4B are separated by a gap 432, which includes (e.g., is immediately adjacent to) a resistive material (e.g., the resistive material 114 of FIGS. 1-3). The resistive material in the gap 432 electrically couples the arms 426, 428. The resulting impedance between the example arms 426, 428 depends on the length and width of the gap 432.

Figure 4C:
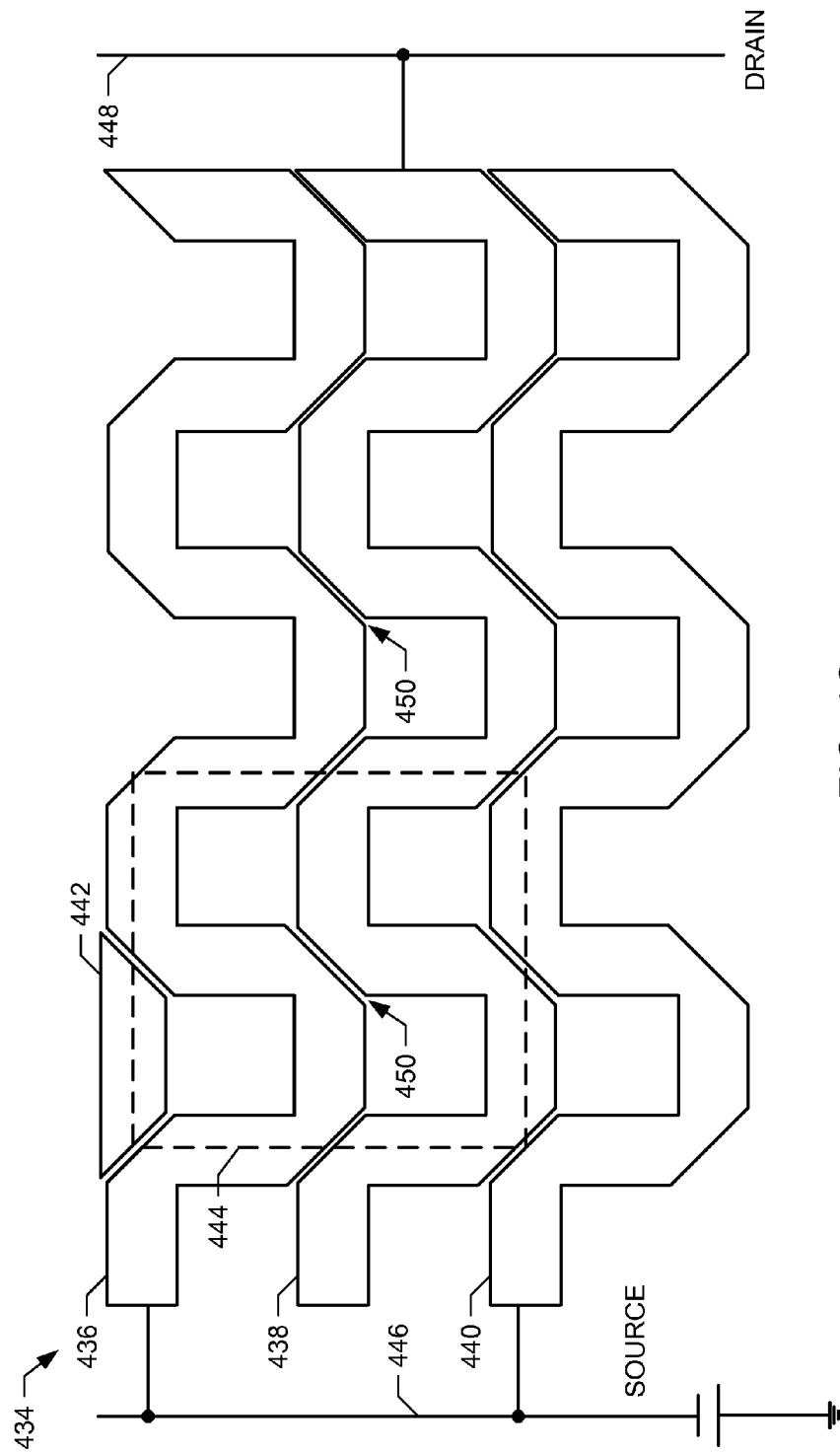

FIG. 4C illustrates another example dipole antenna structure 434 that may be used to implement the example resonators 110 of FIGS. 1-3. In the example of FIG. 4C, the dipole antenna structure 434 includes microstrip traces or conductive elements 436, 438, 440, 442 that operate as arms or conductive elements of the dipole antenna within an antenna unit 444. The example antenna unit 444 is illustrated in FIG. 4C, and operates as a dipole antenna similar to the example antenna 424 of FIG. 4B. The example microstrip traces 436-442 are alternately coupled to a source connection 446 or to a drain connection 448. Thus, multiple (e.g., an array of) antenna units 444 are coupled to the source 446 or to the drain 448 via the same microstrip trace 436. A resistive material (e.g., the resistive material 114 of FIGS. 1-3) couples the example microstrip traces 436-442 in respective gap areas 450 to control the reflectivity of the example antenna structure 434. The resulting impedance between the microstrip traces (e.g., the traces 436, 438) in a unit 444 depends on the dimensions (e.g., the length and width) of the gap 450.

Figure 5A:
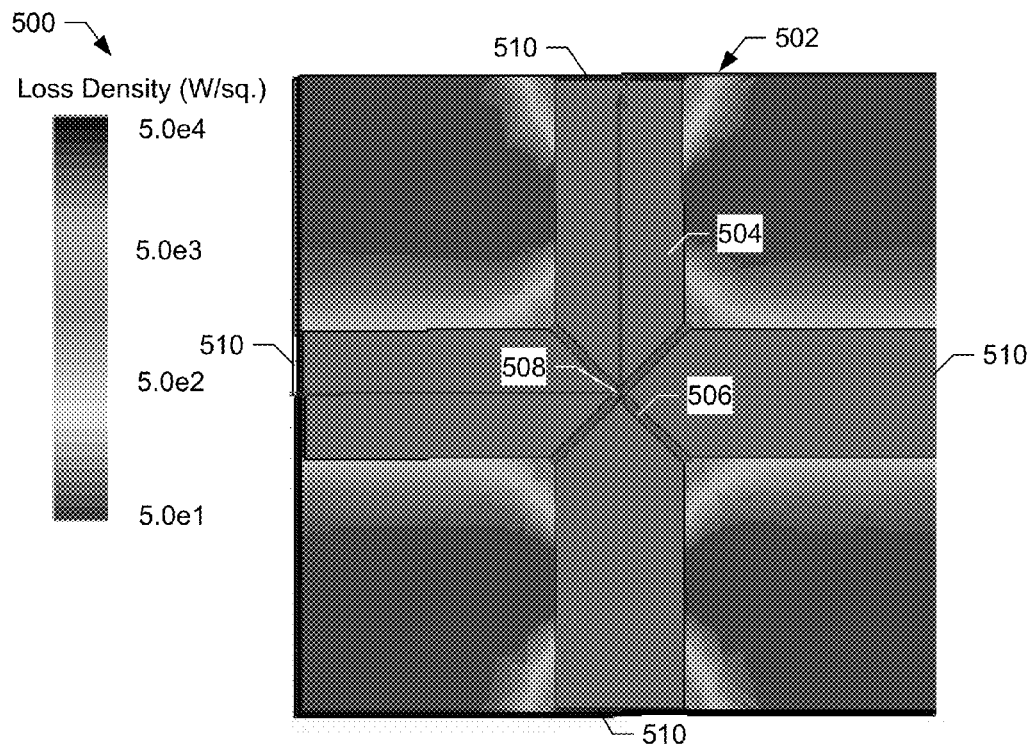
FIG. 5A is a heat map of loss density for an example material controlled to have a relatively high emissivity in a wavelength range of interest.
Figure 5B:
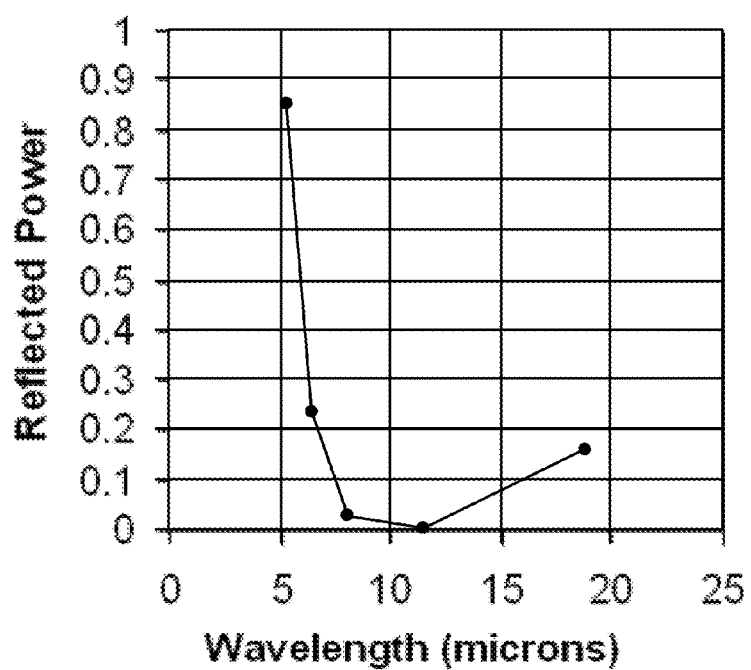
FIG. 5B is a graph illustrating reflected power as a function of wavelength for the example of FIG. 5A.

FIG. 5A is a heat map 500 of loss density for an example apparatus 502 controlled to have a relatively high emissivity in a wavelength range of interest. FIG. 5B is a graph illustrating reflected power as a function of wavelength for the example apparatus 502 of FIG. 5A. The example apparatus 502 illustrated in FIG. 5 includes a crossed dipole antenna 504 similar to the example crossed dipole antenna 400 described above with reference to FIG. 4A. The arms of the crossed dipole antenna 504 are separated by a gap region 506.

FIG. 5A provides a map of the absorption assuming a uniform impedance layer of 1580 ohms ($\Omega$) or ohms per square ($\Omega$/sq., a measure of sheet resistance) across the cell. The example crossed dipole antenna structure of FIGS. 4A and 5A concentrates most LWIR radiation absorption in the gap region 506, but the absorption outside the gap region 506 is not negligible. As illustrated in FIG. 5B, the example apparatus 502 shows very low LWIR reflectance (e.g., high emissivity) versus wavelength for the case where the absorber is located in the gaps. The example results of FIGS. 5A and 5B were achieved with 27.5 nanometer (nm) gaps and an assumed channel resistance of 1580 $\Omega$/sq. unit. This corresponds to a net resistance of about 123$\Omega$ for the "X" at the center 508 of the antenna 502 and about 87$\Omega$ for the gaps 510 between adjacent antenna arms at the top, bottom, left, and right of the example illustrated in FIG. 5A.

Figure 6A:
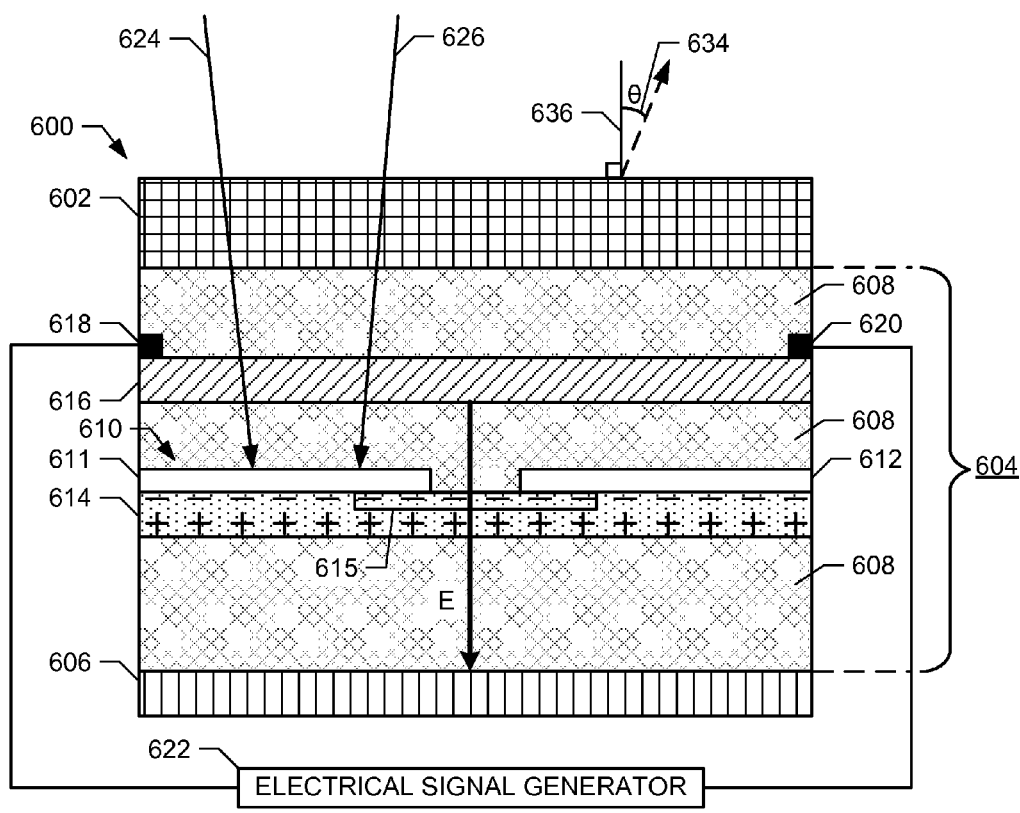
FIGS. 6A and 6B illustrate a sectional view of another example material having a tunable emissivity constructed in accordance with the teachings of this disclosure.
Figure 6B:
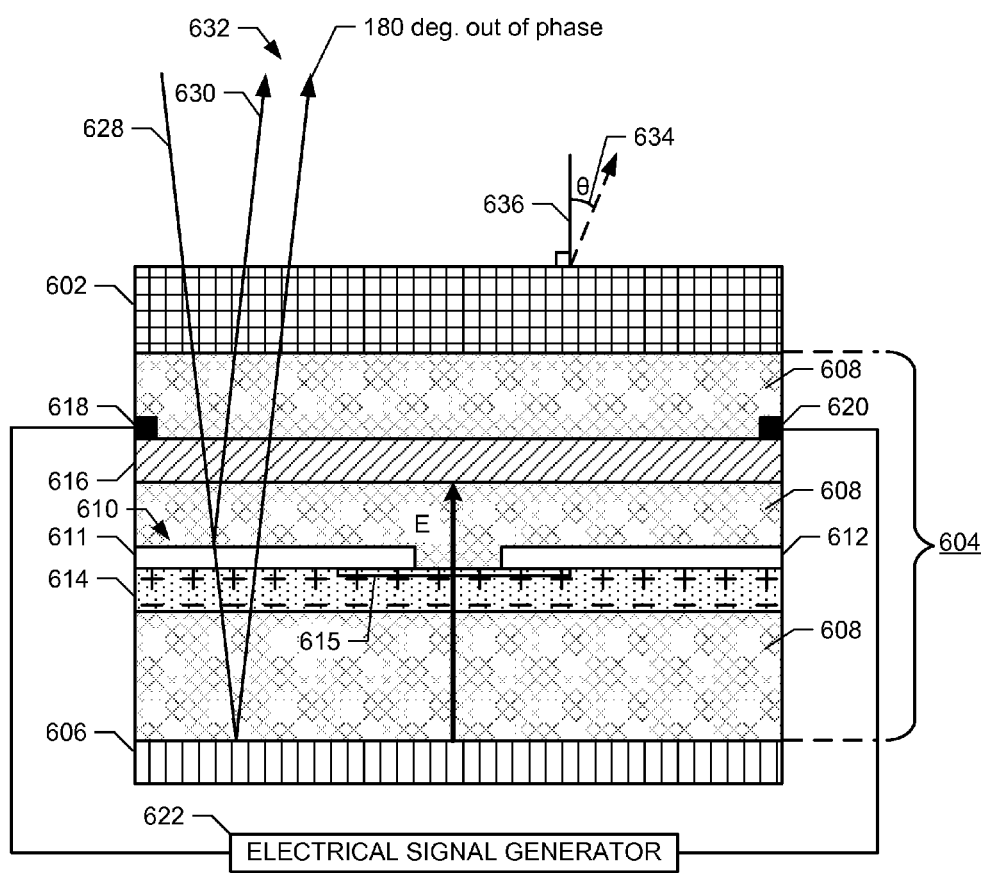

FIGS. 6A and 6B illustrate a sectional view of another example apparatus 600 having a tunable emissivity constructed in accordance with the teachings of this disclosure. Unlike the apparatus 100 of FIGS. 1-3, the example apparatus 600 enables a tunable emissivity by application of an electrical signal to the apparatus 600. In some examples, the emissivity of the apparatus 600 may be changed or tuned between 0.05 and 0.95, inclusive, for a range of wavelengths.

The example apparatus 600 includes an anti-reflective coating 602 and an impedance layer 604. In the example of FIGS. 6A and 6B, the example apparatus 600 is attached to an electrically reflective surface 606. In some other examples, the apparatus 600 includes the electrically reflective surface 606 and the apparatus 600 may be attached to any surface, whether electrically reflective or not.

The example impedance layer 604 of FIGS. 6A and 6B includes a dielectric material or layers 608 and a resonator 610. The example resonator 610 of FIG. 6A includes conductive elements 611, 612, and a resistive material 614. The example dielectric material 608 of FIG. 6 may be, for example, zinc sulfide (ZnS) or indium gallium zinc sulfide (InGaZnS). However, other dielectric materials may additionally or alternatively be used as the dielectric material 608. Further, when the example impedance layer 604 has multiple layers of the dielectric material 608, combinations of different dielectric materials may be used.

The example resonator 610 of FIGS. 6A and 6B includes a single crossed dipole antenna and may be identical to, similar to, and/or different from the example resonators 110 and/or antennas 400, 420, or 504 of FIGS. 1-5A. The antenna arms 611, 612 are positioned substantially parallel to and about ¼ of the wavelength of interest from the example electrically reflective surface 606. The example resistive material 614 is positioned immediately adjacent the resonator 610 (e.g., adjacent the arms 611, 612, on the same side of the resonator 610 as the electrically reflective surface 606). In the example of FIGS. 6A and 6B, the resistive material 614 is constructed using an amorphous oxide semiconductor (AOS) material. Example AOS materials include indium gallium zinc oxide (IGZO), zinc indium oxide (ZIO), and zinc tin oxide (ZTO). Other semiconductor materials may also be used.

The example impedance layer 604 of FIGS. 6A and 6B further includes a conductor layer 616. The example conductor layer 616 comprises a weak conductor (e.g., having a sheet resistance greater than 40 kilo-ohms per square (40 kΩ/sq.)). Additional conductors 618, 620 are in contact with the conductor layer 616 and provide a bias signal to the conductor layer 616. The example apparatus 600 of FIGS. 6A-6B receives the bias signal from an electrical signal generator 622. Based on the signal provided by the electrical signal generator 622 via the conductors 618, 620, the example conductor layer 616 generates an electric field E. The example conductors 618, 620 are relatively sparse (e.g., sufficiently thin and spaced apart sufficiently). In some examples, the conductors are thin (e.g., about 1 μm diameter) and spaced apart (e.g., one conductor per row of resonators in a sheet arrangement) so as to not cause substantial reflection of incoming radiation.

The resistance of the resistive material 614 (e.g., AOS) in the gap between the conductive elements 611, 612 is controlled by the example electric field E. Applying a voltage between the electrically reflective surface 606 (e.g., via the conductors 618, 620) and the electrically reflective surface 606 generates the electric field E, which induces electron migration in the resistive material 614 and creates or enlarges (e.g., makes less resistive) a conductive channel 615. When the electrons are pushed toward the conductive elements 611, 612 (e.g., against the top of the resistive material 614 in the example of FIG. 6A, shown as minus (−) symbols located near the conductive elements 611, 612), the resistance between the conductive elements 611, 612 decreases. As a result, the example load (e.g., the resistive material 614 functioning as a resonator load) is better matched to the resonator, and the apparatus 600 absorbs more radiation (e.g., increases emissivity, reduces reflectance). Example radiation 624, 626 is mostly absorbed by the example resonator 610.

In contrast, when the electric field E is reversed as illustrated in FIG. 6B, the electrons are pushed away from the conductive elements 611, 612 (shown as minus (−) symbols located away from the conductive elements 611, 612 and plus (+) symbols located near the conductive elements 611, 612) the resistance of the conductive channel 615 between the resonators 610, 612 is increased by the resistive material 614 (e.g., the conductive channel 615 is restricted or eliminated). The apparatus 600 becomes more reflective (e.g., decreases emissivity, increases reflectance) because the resonator load becomes poorly matched and the resonator absorbs less radiation. Example radiation 628, 630 is mostly reflected by the resonator 610 and the conductive ground plane 606.

In the example of FIGS. 6A and 6B, the resonator 610 is positioned a distance H from the ground plane 606 such that radiation or radiated energy 630 reflected from the resonator 610 experiences destructive interference with radiation or radiated energy 628 reflected from the ground plane 606 the reflections of the radiation or radiated energy 628, 630 are out of phase by 180 degrees and create destructive interference 632. The destructive interference 632 effectively cancels some or all of the energy in the radiation 628, 630.

The transition in the electric field E may be accomplished in the example apparatus 600 in less than 1 millisecond (ms). Additionally, the resistive material 614 maintains the electric field E when the signal is removed from the example conductors 618, 620 and the conductive layer 616. Therefore, the example apparatus 600 does not require consistent power to maintain a desired emissivity. In some examples, the resistive material 614 and the example conductive layer 616 are replaced by a thin film transistor (TFT) to control the impedance between the resonators 610, 612.

The example apparatus 600 of FIGS. 6A-6B may be constructed using methods such as sputtering and vapor deposition (e.g., for the dielectric material 608, the resistive material 614, and/or the conductive layer 616) and photolithography and/or electron-beam lithography (e.g., for the resonators 610, 612). However, any suitable past, present, or future method may be used to manufacture the example apparatus 600 of FIGS. 6A-6B.

The example apparatus 600 of FIGS. 6A-6B demonstrates advantageous results. For example, where the conductive layer (e.g., the conductive layer 616 of FIG. 6) has a sheet resistance of about 40 kΩ/sq (to substantially match the impedance of the resonator 610 of FIG. 6), and the incident angle θ 634 of the radiation (e.g., from the external environment) is zero degrees 636 (e.g., normal incidence), the example apparatus 600 has a relatively high emissivity (e.g., reflected power less than 0.1) in the 7-25 μm wavelength range such as the wavelength range 807.

In another example, the conductive layer (e.g., the conductive layer 616 of FIG. 6) has a sheet resistance of about 40 kΩ/sq and the incident angle of the radiation (e.g., from the external environment) is 45 degrees from normal. The reflected power in this example is less than 0.3 in the 7-25 μm wavelength range, which indicates a relatively high emissivity.

In an example in which, the conductive layer (e.g., the conductive layer 616 of FIGS. 6A-6B) has a sheet resistance of about 40 kΩ/sq but is unmatched to the impedance of the resonator 610 of FIGS. 6A-6B, the resonator 610 absorbs substantially less radiation than when using the matched loads. In such an example, the apparatus 600 has a relatively low emissivity (e.g., reflected power greater than 0.95) in the 5-50 μm wavelength range.

As demonstrated by the examples, the emissivity of the example apparatus 600 of FIGS. 6A-6B may be changed by matching and/or unmatching the load impedance of the resonator 610. For a frequency and/or frequency range of interest, the emissivity of the example apparatus 600 may be advantageously tuned or changed at least within the range of 0.05-0.95 or a greater range.

Figure 7A:
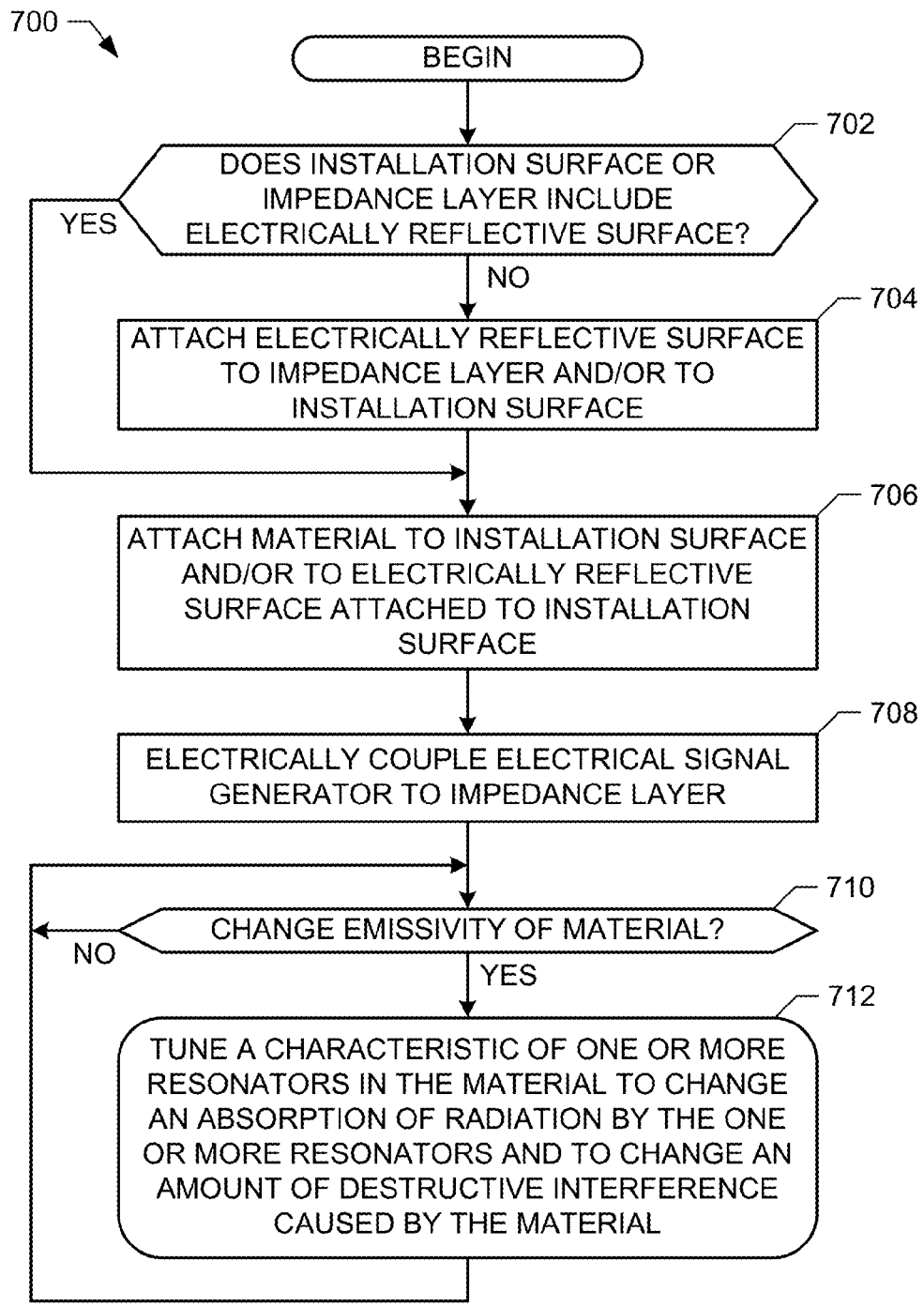
FIG. 7A is a flowchart representative of an example method to install and control an example sheet-shaped apparatus having a tunable emissivity on a surface.

FIG. 7A is a flowchart representative of an example method 700 to install and control an apparatus (e.g., a sheet or layer formed using the examples described herein) having a tunable emissivity on an installation surface. Although the example method 700 is described with reference to the flowchart illustrated in FIG. 7A, many other methods of installing and controlling an apparatus having a tunable emissivity on a surface may alternatively be used. For example, the order of execution of the blocks may be changed, and/or some of the blocks described may be changed, eliminated, or combined. Examples of an installation surface onto which the example method 700 may be used to apply the examples described herein include aircraft, spacecraft, buildings, vehicles, equipment, and/or substantially any other surface.

The example method 700 of FIG. 7A may be used to, for example, install either of the example apparatus 100, 600 of FIGS. 1-3 and/or 6A-6B on a surface, or install a different apparatus on a surface. In the example method 700 of FIG. 7A, the apparatus to be installed on a surface includes an impedance layer (e.g., the impedance layer 104 of FIG. 1, the impedance layer 604 of FIGS. 6A-6B).

The example method 700 of FIG. 7A begins by determining whether an installation surface (e.g., a surface onto which the material is to be installed) and/or an impedance layer (e.g., the impedance layer 604 of FIGS. 6A-6B) includes an electrically reflective surface (block 702). In some examples, the surface onto which the apparatus is to be installed has an electrically reflective outer layer onto which the apparatus is to be attached. In some other examples, the apparatus to be installed includes an electrically reflective surface (e.g., the electrically reflective surfaces 106, 606 of FIGS. 1-3, 6A-6B). In these cases, an additional electrically reflective surface is not applied.

If neither the installation surface nor the impedance layer includes an electrically reflective surface (block 702), an electrically reflective surface is attached to at least one of the impedance sheet or the installation surface (block 704). For example, an electrically reflective surface may be attached to the outer surface of the installation surface and/or to the side of the apparatus to be attached to the installation surface, such that the electrically reflective surface is positioned between the apparatus and the installation surface. If attached to the apparatus, the electrically reflective surface is considered a part of the apparatus.

After attaching the electrically reflective surface (block 704) or if the installation surface and/or the impedance layer include an electrically reflective surface (block 702), the apparatus (e.g., the impedance layer) is attached to the installation surface and/or to the electrically reflective surface attached to the installation surface (block 706).

An electrical signal generator (e.g., the electrical signal generator 622 of FIGS. 6A-6B) is electrically coupled to the impedance layer (e.g., to conductors 618, 620 of FIGS. 6A-6B) (block 708). When the emissivity of the installed material is to be changed (block 710), a characteristic of one or more resonators in a material is tuned to change an absorption of radiation by the one or more resonators and to change an amount of destructive interference caused by the material (block 712). The emissivity may be changed in response to a temperature change in a structure (e.g., the body 800 of FIG. 8) adjacent the apparatus 600, a change in an incident angle θ of radiation relative to the apparatus 600, a change in intensity (e.g., concentration) of radiation at the apparatus 600, and/or a change in conditions external to the apparatus 600 (e.g., a temperature change external to the apparatus 600).

Tuning the characteristic (block 712) may include, for example, applying an electrical signal to the example conductors 618, 620, thereby generating an electrical field E (e.g., the electrical field E of FIGS. 6A and 6B) to change an impedance of the resistive layer 614 between the conductive elements 611, 612. In some other examples, tuning the characteristic includes tuning at least one of a geometry of the resonator 610 (e.g., changing the length 420 or width 422 of the gaps 412-418 between the conductive elements 402-408 of FIG. 4A), tuning an arrangement of two or more resonators 610 (e.g., changing the distance, such as the gap length G of FIG. 3, between resonators 610 and/or the relative orientations of resonators 610), tuning a static impedance of the one or more resonators (e.g., selecting and/or changing an impedance of the resistive layer 614), and/or creating, modifying, or eliminating the conductive channel 615 between the conductive elements 611, 612 of the resonator 610. Tuning the characteristic may additionally or alternatively include tuning any other type of characteristics of the example resonator 610. An example method 720 to implement block 712 is described below with reference to FIG. 7B.

The example blocks 710-712 iterate to substantially continuously monitor and/or change the emissivity of the apparatus (e.g., based on changing external environment conditions). In some examples in which the material has a fixed emissivity, blocks 708-712 may be omitted and the example method 700 ends after block 706.

Figure 7B:
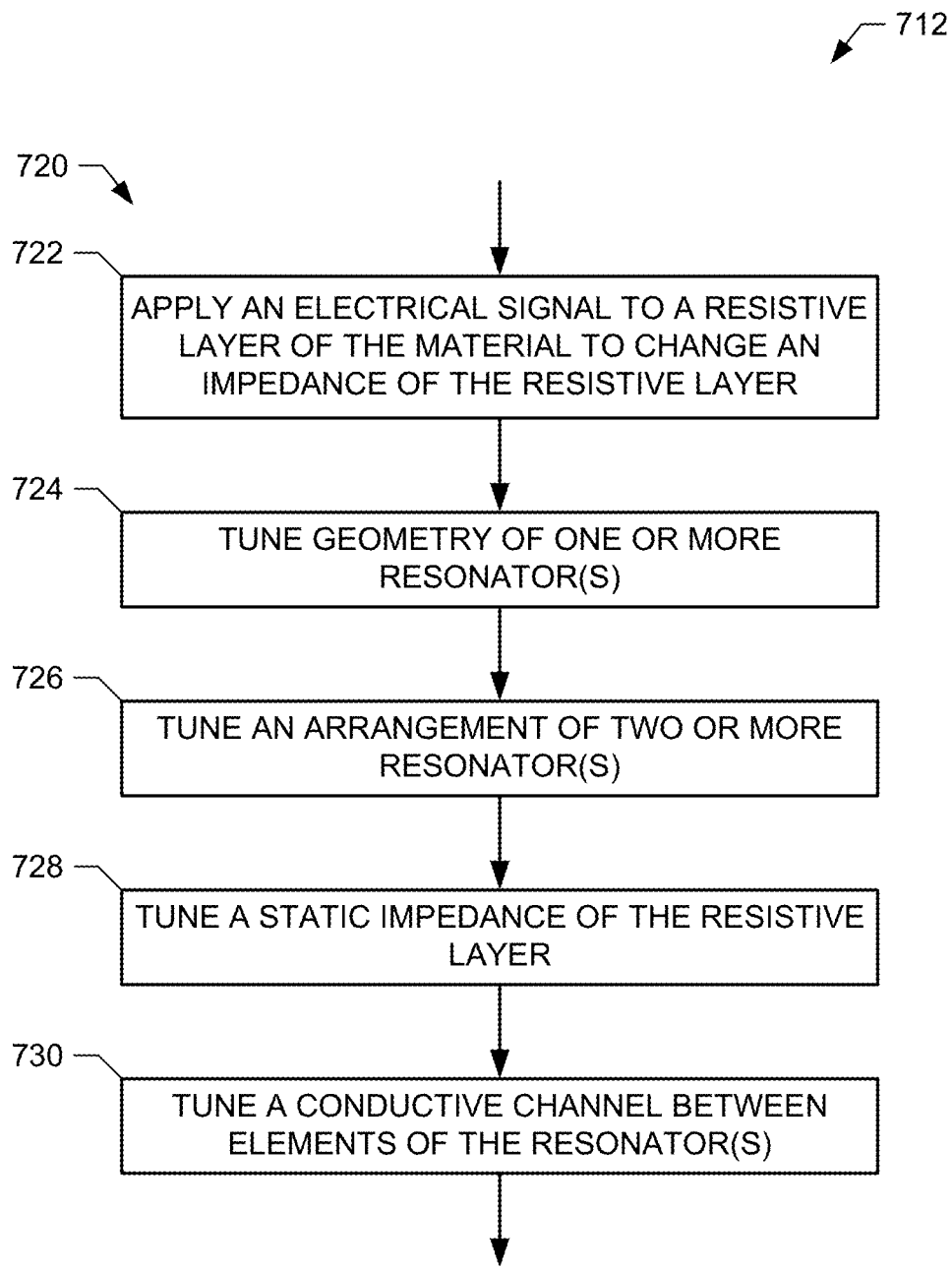
FIG. 7B is a flowchart representative of an example method to tune a characteristic of one or more resonators in a material.

FIG. 7B is a flowchart representative of an example method 720 to tune a characteristic of one or more resonators in a material. The example method 720 of FIG. 7B may be used to implement the example block 712 of FIG. 7A to tune a characteristic of a resonator, such as the example resonator 610 in the material 600 of FIGS. 6A and 6B, to change an absorption of radiation by the resonator and to change an amount of destructive interference caused by the material.

The example method 720 tunes a characteristic of a resonator (e.g., the resonator 610 of FIGS. 6A and 6B) by applying an electrical signal to a resistive layer 614 (block 722). For example, the conductive layer 616 and the conductors 618, 620 of FIGS. 6A and 6B may be used to apply the electrical field E to the resistive layer 614, thereby changing the impedance of the resistive layer 614. As a result, block 722 may change an absorption of radiation by the resonator and to change an amount of destructive interference caused by the material.

The example method 720 tunes a geometry of one or more resonators (block 724). For example, the dimensions and/or configuration of the example resonator 610 (e.g., the conductive elements 611, 612 of FIGS. 6A and 6B) may be tuned to change an absorption of radiation by the resonator and to change an amount of destructive interference caused by the apparatus 600.

The example method 720 tunes an arrangement of two or more resonator(s) (block 726). For example, the relative orientations and/or geometries of the example resonators 110a, 110b of FIG. 3 may be tuned to change an absorption of radiation by the resonators 110a, 110b and to change an amount of destructive interference 632 caused by the material 300.

The example method 720 tunes a static impedance of the resistive layer (e.g., the resistive layer 614) (block 728). For example, changing the static impedance of the resistive layer 614 may include changing the resistive layer 614 to a different substance and/or changing the dimensions of the resistive layer 614. As a result, the method 720 change an absorption of radiation by the resonator 610 and changes an amount of destructive interference 632 caused by the apparatus 600.

The example method 720 tunes a conductive channel (e.g., the conductive channel 615) between elements (e.g., the conductive elements 611, 612) of the resonator 610 (block 730). For example, tuning the conductive channel 615 may include creating, modifying, and/or eliminating the conductive channel 615 to change the impedance between the conductive elements 611, 612. The resulting change in impedance change an absorption of radiation by the resonator 610 and changes an amount of destructive interference 632 caused by the apparatus 600.

While blocks 722-730 are included in the example method 720 of FIG. 7B, one or more of the blocks 722-730 may be omitted, rearranged, and/or otherwise modified in accordance with the teachings of this disclosure.

Figure 9:
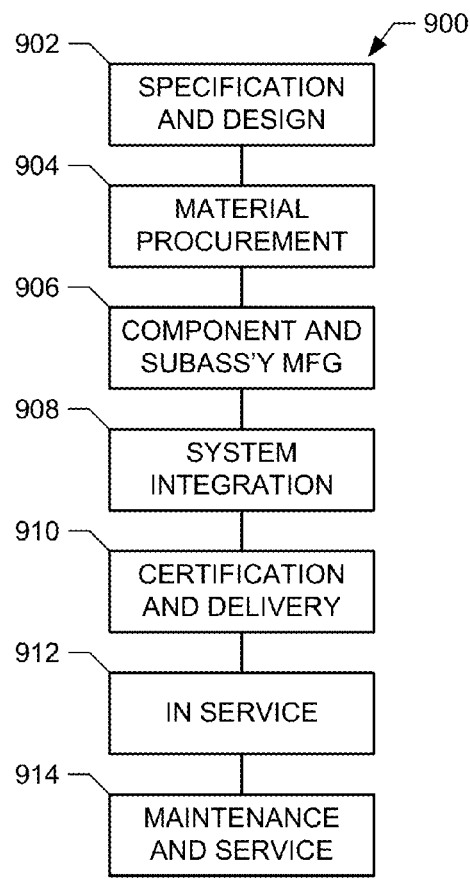
FIG. 9 is a flowchart of vehicle production and service methodology.
Figure 10:
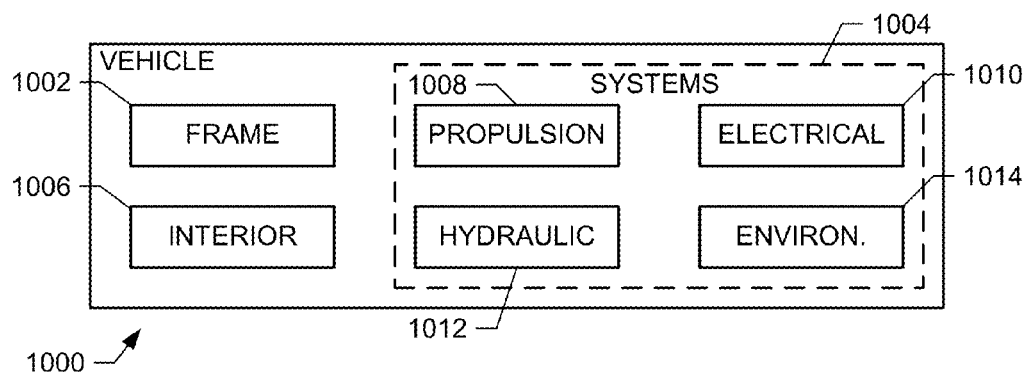
FIG. 10 is a block diagram of a vehicle.

Embodiments of the disclosure may be described in the context of a vehicle manufacturing and service method 900 as shown in FIG. 9 and a vehicle 1000, such as an aircraft or a spacecraft, as shown in FIG. 10. During pre-production, exemplary method 900 may include specification and design 902 of the vehicle 1000 (e.g., aircraft, spacecraft) and material procurement 904. During production, component and subassembly manufacturing 906 and system integration 908 of the vehicle 1000 (e.g., aircraft, spacecraft) takes place. Thereafter, the vehicle 1000 (e.g., aircraft, spacecraft) may go through certification and delivery 910 in order to be placed in service 912. While in service by a customer, the vehicle 1000 is scheduled for routine maintenance and service 914 (which may also include modification, reconfiguration, refurbishment, and so on).

Each of the processes of method 900 may be performed or carried out by a system integrator, a third party, and/or an operator (e.g., a customer). For the purposes of this description, a system integrator may include without limitation any number of vehicle (e.g., aircraft, spacecraft) manufacturers and major-system subcontractors; a third party may include without limitation any number of venders, subcontractors, and suppliers; and an operator may be an airline, leasing company, military entity, service organization, and so on.

As shown in FIG. 10, the vehicle 1000 (e.g., aircraft, spacecraft) produced by exemplary method 900 may include a frame 1002 (e.g., an airframe) with a plurality of systems 1004 and an interior 1006. Examples of high-level systems 1004 include one or more of a propulsion system 1008, an electrical system 1010, a hydraulic system 1012, and an environmental system 1014. The example methods and apparatus disclosed herein may be integrated into any of the frame 1002, the systems 1004-1014, and/or the interior 1006 to, for example, control a temperature of the vehicle 1000 (e.g., aircraft, spacecraft). Any number of other systems may be included. Although an aerospace example is shown, the principles of the invention may be applied to other industries, such as the automotive industry.

Apparatus and methods embodied herein may be employed during any one or more of the stages of the production and service method 900. In some examples, apparatus and methods embodied herein have a tunable emissivity that is tuned during the component or subassembly manufacturing process 906. For example, components or subassemblies corresponding to production process 906 may be fabricated or manufactured in a manner similar to components or subassemblies produced while the vehicle 1000 (e.g., aircraft, spacecraft) is in service. Also, one or more apparatus embodiments, method embodiments, or a combination thereof may be utilized during the production stages 906 and 908, for example, by substantially expediting assembly of or reducing the cost of an vehicle 1000 (e.g., aircraft, spacecraft). Similarly, one or more of apparatus embodiments, method embodiments, or a combination thereof may be utilized while the vehicle 1000 (e.g., aircraft, spacecraft) is in service, for example and without limitation, to maintenance and service 914. In some example apparatus and methods embodied herein, the emissivity is tunable (e.g., by applying an electrical signal) while the vehicle 1000 (e.g., aircraft, spacecraft) is in service in block 912 and/or during maintenance or service 914.

From the foregoing, it will appreciated that the above disclosed apparatus and methods may be used to control an emissivity of a surface. Example apparatus and methods disclosed herein may provide a wide range of emissivities such as a range between 0.05 and 0.95. Additionally, example apparatus and methods are effective over a range of wavelengths. The example apparatus and methods may be used to, for example, reduce solar heat loads on structures (e.g., aircraft, spacecraft, buildings, vehicles, equipment, etc.), reduce temperature swings by regulating emissivity, rapidly perform infrared camera calibration, actively control temperature of a structure in response to changes in temperature of the structure, and/or provide materials or structures having desired emissivities for particular applications. Example apparatus and methods disclosed herein use low amounts of power to control emissivity and can change the emissivity of a surface in approximately the same amount of time as a transistor state change.

Although certain example apparatus and methods have been described herein, the scope of coverage of this patent is not limited thereto. On the contrary, this patent covers all apparatus and methods fairly falling within the scope of the claims of this patent.

What is claimed is:

1. An apparatus, comprising:
an impedance layer comprising a layer of dielectric material to be attached to an electrically reflective ground plane; and
a plurality of resonators arranged within the impedance layer, the plurality of resonators positioned a quarter-wavelength of a resonant frequency of the resonators from the electrically reflective ground plane, a first one of the plurality of resonators comprising a plurality of conductive elements;
an amorphous oxide semiconductor material in contact with the plurality of conductive elements to electrically couple the plurality of conductive elements; and
a conductive material to, when a voltage is applied to the conductive material based on an incident angle of radiation on the apparatus, adjust a resistivity of the amorphous oxide semiconductor material such that an emissivity of the apparatus changes based on the incident angle of the radiation.

2. An apparatus as defined in claim 1, wherein the plurality of conductive elements are electrically connected via a resistive material.

3. An apparatus as defined in claim 1, wherein the resonators are arranged to be substantially parallel to the electrically reflective ground plane.

4. An apparatus as defined in claim 1, wherein the plurality of conductive elements are structured as an antenna, and the amorphous oxide semiconductor material is in contact with the antenna such that the amorphous oxide semiconductor material is a load on the antenna.

5. An apparatus as defined in claim 4, wherein the conductive material is to change the load on the antenna when the voltage is applied to the conductive material.

6. An apparatus as defined in claim 1, wherein the amorphous oxide semiconductor material comprises at least one of indium gallium zinc oxide, zinc indium oxide, or zinc tin oxide.

7. An apparatus as defined in claim 1, wherein the amorphous oxide semiconductor material is to retain an adjusted resistivity after removal of the voltage from the conductive material.

8. An apparatus as defined in claim 1, wherein the conductive material has a sheet resistivity of at least 40 kilo-ohms per square.

9. An apparatus as defined in claim 1, wherein the plurality of resonators are positioned a distance from the electrically reflective ground plane, the distance being based on long wavelength infrared energy.

10. An apparatus as defined in claim 1, further comprising an anti-reflection coating attached to the impedance layer to be opposite the electrically reflective ground plane.

11. An apparatus as defined in claim 10, wherein the anti-reflection coating has a thickness substantially equal to one-quarter of a wavelength of interest.

12. An apparatus as defined in claim 10, wherein the anti-reflection coating has a thickness substantially equal to a distance from the resonators to the electrically reflective ground plane.

13. A spacecraft coating, comprising:
an impedance layer comprising a layer of dielectric material to be attached to an electrically reflective surface on the spacecraft; and
a plurality of resonators arranged within the impedance layer, the plurality of resonators positioned a quarter-wavelength of a resonant frequency of the resonators from the electrically reflective surface on the spacecraft, a first one of the plurality of resonators comprising a plurality of conductive elements and having a first impedance;
a resistive material in contact with the plurality of conductive elements to electrically couple the plurality of conductive elements, the resistive material having a second impedance; and
a conductor layer to:
when a first voltage is applied to the conductor layer, adjust a resistivity of the resistive material to increase a difference between the first impedance and the second impedance to decrease an emissivity of the coating; and
when a second voltage is applied to the conductor layer, adjust the resistivity of the resistive material to reduce the difference between the first impedance and the second impedance to increase the emissivity of the coating.

14. A spacecraft coating as defined in claim 13, wherein at least one of the first voltage or the second voltage is based on an incident angle of the spacecraft to radiation source.

15. A metamaterial having a tunable emissivity, comprising:
a plurality of resonators positioned a quarter-wavelength of a resonant frequency of the resonators from a ground plane such that energy reflected from the resonators at the resonant frequency and energy reflected from the ground plane at the resonant frequency result in destructive interference, a first one of the resonators comprising multiple physically separate conductive components;
a dielectric layer positioned between the plurality of resonators and the ground plane;
a resistive material in contact with the first one of the resonators, the resistive material to exhibit electron migration in response to an electric field to thereby change a resistivity of an electrically conductive channel connecting the multiple physically separate conductive components of the first one of the resonators; and
a conductive layer to apply the electric field to change an absorption by the first one of the resonators to thereby change an amount of destructive interference occurring within the dielectric layer.

16. A metamaterial as defined in claim 15, wherein the first one of the resonators has a width substantially equal to one-half of a wavelength corresponding to the resonant frequency.

17. A metamaterial as defined in claim 15, wherein the first one of the resonators comprises a crossed dipole antenna having a plurality of antenna arms.

18. A metamaterial as defined in claim 15, wherein the electric field is to decrease a difference between a first impedance of the resistive material and an impedance value associated with the first one of the resonators to increase an emissivity of the metamaterial.

19. A metamaterial as defined in claim 15, wherein the electric field is to increase a difference between a first impedance of the resistive material and an impedance value associated with the first one of the resonators to decrease an emissivity of the metamaterial.

20. An apparatus, comprising:
an impedance layer comprising a layer of dielectric material to be attached to an electrically reflective ground plane; and
a plurality of resonators arranged within the impedance layer, a first one of the plurality of resonators comprising a plurality of conductive elements;
an amorphous oxide semiconductor material in contact with the plurality of conductive elements to electrically couple the plurality of conductive elements; and
a conductive material to, when a voltage is applied to the conductive material based on an incident angle of radiation on the apparatus, adjust a resistivity of the amorphous oxide semiconductor material such that an emissivity of the apparatus changes based on the incident angle of the radiation, the voltage being based on the cosine of an angle between the radiation and a normal angle of an exterior surface of the apparatus, and wherein the voltage is to change the emissivity of the apparatus such that an absorption of the radiation matches an emitted radiation of the apparatus.

* * * * *